US008155076B2

(12) United States Patent
Horn et al.

(10) Patent No.: US 8,155,076 B2
(45) Date of Patent: Apr. 10, 2012

(54) MAINTAINING A GLOBAL AND LOCAL SESSION STATE IN AN ACCESS NETWORK

(75) Inventors: Gavin Horn, La Jolla, CA (US); Fatih Ulupinar, San Diego, CA (US); Paul E. Bender, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 11/759,838

(22) Filed: Jun. 7, 2007

(65) Prior Publication Data
US 2007/0286141 A1 Dec. 13, 2007

Related U.S. Application Data

(60) Provisional application No. 60/812,014, filed on Jun. 7, 2006.

(51) Int. Cl.
*H04W 4/00* (2009.01)
*G06F 15/16* (2006.01)

(52) U.S. Cl. .......................... 370/331; 709/203; 455/436

(58) Field of Classification Search .................. 370/231, 370/331; 707/10; 709/203; 463/42; 455/436–44
See application file for complete search history.

(56) References Cited

U.S. PATENT DOCUMENTS

| 6,353,599 | B1* | 3/2002 | Bi et al. ........................ 370/328 |
| 6,947,761 | B2 | 9/2005 | Hutcheson et al. | |
| 2002/0065894 | A1* | 5/2002 | Dalal et al. ..................... 709/206 |
| 2003/0167331 | A1* | 9/2003 | Kumar et al. .................. 709/227 |
| 2004/0029638 | A1* | 2/2004 | Hytcheson et al. ............. 463/42 |
| 2004/0158608 | A1* | 8/2004 | Friedman ....................... 709/206 |
| 2006/0123122 | A1* | 6/2006 | Jung et al. ...................... 709/227 |
| 2006/0143217 | A1* | 6/2006 | Stanev et al. .................. 707/102 |
| 2007/0168520 | A1* | 7/2007 | Perkins et al. ................. 709/227 |
| 2007/0189218 | A1* | 8/2007 | Oba et al. ....................... 370/331 |
| 2007/0280243 | A1 | 12/2007 | Wray et al. | |

FOREIGN PATENT DOCUMENTS

| KR | 0249501 | 12/1999 |
| RU | 2073913 | 2/1997 |
| RU | 2262810 | 10/2005 |
| WO | WO02084898 | 10/2002 |
| WO | WO2005115026 | 12/2005 |
| WO | WO2006033940 A2 | 3/2006 |

OTHER PUBLICATIONS

International Search Report—PCT/US07/070649, International Search Authority—European Patent Office—Jan. 24, 2008.
Taiwanese Search report—096120625—TIPO—Aug. 31, 2010.
Translation of Office Action in Korean application 2008-7031434 corresponding to U.S. Appl. No. 11/759,838, citing KR100249501 and US20020065894 dated Jan. 26, 2011.
Written Opinion—PCT/US07/070649, International Searching Authority—European Patent Office, Jan. 24, 2008.

* cited by examiner

*Primary Examiner* — Ricky Ngo
*Assistant Examiner* — Paul H Masur
(74) *Attorney, Agent, or Firm* — Milan Patel; Darren M. Simon

(57) ABSTRACT

Apparatus, methods, and machine-readable medium wherein a global session state for communications between an access terminal and a plurality of network functions in the access network is maintained, and a local session state for communications between the access terminal and one of the network functions in the access network is also maintained.

54 Claims, 6 Drawing Sheets

MAINTAINING A GLOBAL AND LOCAL SESSION STATE IN AN ACCESS NETWORK

RELATED APPLICATIONS

The present application claims the benefit of U.S. Provisional Patent Application Ser. No. 60/812,014 filed on Jun. 7, 2006, titled "A METHOD AND APPARATUS FOR GLOBAL AND LOCAL SESSION STATE" which is hereby expressly incorporated by reference.

FIELD

The present disclosure relates generally to wireless communication networks, and more particularly, to various concepts and techniques for maintaining a global and local session state.

BACKGROUND

Wireless communication systems are widely deployed to provide various communication services such as telephony, video, data, messaging, broadcasts, and so on. These systems commonly employ an access network capable of connecting multiple access terminals to a wide area network (WAN) by sharing the available network resources. The access network is generally implemented with multiple access points dispersed throughout a geographic coverage region. The geographic coverage region is generally divided into cells with an access point in each cell. The cell may be further divided into sectors. The access point generally includes one transceiver function for each sector in the cell. The transceiver function provides an air interface attachment point for access terminals in the sector.

The access network may also include one or more network functions. In a typical configuration, the network function acts as a controller for any number of transceiver functions and performs various tasks including allocating, managing and tearing down resources for the access terminals. The network function also provides an Internet Protocol (IP) layer attachment point (IAP) for the access terminals. All IP packets destined for the access terminal are sent via the IAP. The access network may have a centralized network architecture defined here as multiple network functions supporting multiple access points, i.e., each network function supporting multiple access points and each access point supported by multiple network functions, or a distributed network architecture defined here as dedicated network function for each access point, i.e., each network function supports a single access point and each access point is supported by a single network function.

In addition to providing an IP layer attachment point, the IAP may also responsible maintaining a session state for any number of access terminals. The session state for an access terminal is the state of the access network on the control path between the access terminal and the IAP that is preserved when a connection is closed. The session state includes the value of the attributes that are negotiated between the access terminal and the access network. These attributes affect the characteristics of the connection and the service received by the access terminal. By way of example, an access terminal may negotiate the quality of service (QoS) configuration for a new application and supply new filter and flow specifications to the access network indicating the QoS service requirements for the application. As another example, the access terminal may negotiate the size and type of the headers used in communication with the access network.

In some wireless communication systems, an access terminal in a given sector establishes a connection with an access point by making an access attempt on an access channel of a transceiver function serving that sector. The network function associated with the transceiver function receiving the access attempt contacts the session master for the access terminal and retrieves a copy of the access terminal's session state. The session master could be a centralized or distributed entity and may or may not be colocated with the IAP. On a successful access attempt, the access terminal is assigned air interface resources such as a MAC ID and data channels to communicate with the transceiver function serving the sector. In addition, the IAP is moved to the serving network function, or alternatively, an IP tunneling protocol is used to send IP packets between the IAP and the serving network function.

In some wireless communication systems, once the access terminal establishes a connection with an access point, it listens for other sectors and measures the signal strength of the sectors it can hear. The access terminal uses these measurements to create an active set. The active set is a set of sectors that have reserved air interface resources for the access terminal. The access terminal will continue to measure the signal strength of other sectors and may add or remove sectors from the active set as it moves around the access network. Alternatively, the access terminal can send a report of the signal strength measurements to the access network so that the access network can maintain the active set.

One function of the active set is to allow the access terminal to quickly switch between sectors and maintain service without having to make a new access attempt. This is achieved by (1) reserving air interface resources for the access terminal in each of the sectors in the active set, and (2) providing a copy of the session state from the session master to each network function serving a sector in the active set. With this approach, the handoff between the sectors can be achieved while minimizing the affect on the QoS service of active applications.

Heretofore, there has been one session state (i.e., a global session state) for an access terminal, and each network function serving a sector in the active set has been required to synchronize to that state. However, it is possible that a network function may want to change the session state temporarily without affecting the global session state maintained at the session master. By way of example, an application such as voice over IP (VoIP) may not require admission control as part of its session state profile, but a very loaded network function may want to require admission control for that application if it is started. Similarly, a network function may want to make a local admission control decision to accept an application, while not wanting to change the global session state for an access terminal to automatically accept that application for admission control on handoff.

As another example, a network function may want to locally disable or enable some features based on the capabilities of the network function. For instance, a network function may have sectors with extra capabilities such as additional antennas as compared to neighboring sectors and may want to use some advanced coding or modulation schemes such as multiple-input multiple-output (MIMO) or beam-forming when communicating with the access terminal. This network function may want to change some local attributes to enable these capabilities without updating the global session state.

Accordingly, there is a need in the art for a mechanism that enables a network function to define a local session state without affecting the global session state for the access network.

SUMMARY

In accordance with one aspect of the disclosure, an apparatus for operation in an access network includes a processing system configured to access a global session state for communications between an access terminal and a plurality of network functions in the access network, the processing system being further configured to maintain a local session state for communicating with the access terminal.

In accordance with another aspect of the disclosure, an apparatus for accessing an access network includes a processing system configured to access a global session state for communications with a plurality of network functions in the access network, the processing system being further configured to maintain a local session state for communicating with one of the network functions.

In accordance with yet another aspect of the disclosure, an apparatus for operation in an access network includes means for accessing a global session state for communications between an access terminal and a plurality of network functions in the access network, and means for maintaining a local session state for communicating with the access terminal.

In accordance with a further aspect of the disclosure, an apparatus for accessing an access network includes means for accessing a global session state for communications with a plurality of network functions in the access network, and means for maintaining a local session state for communicating with one of the network functions.

In accordance with yet a further aspect of the disclosure, a method of operating in an access network includes accessing a global session state for communications between an access terminal and a plurality of network functions in the access network, and maintaining a local session state for communicating with the access terminal.

In accordance with still yet a further aspect of the disclosure, a method of communicating with access network includes accessing a global session state for communications with a plurality of network functions in the access network, and maintaining a local session state for communicating with one of the network functions.

In accordance with another aspect of the disclosure, a machine-readable medium comprising instructions executable by one or more processors in an apparatus, the instructions include code to access a global session state for communications between an access terminal and a plurality of network functions in the access network, and code to maintain a local session state for communicating with the access terminal.

In accordance with yet another aspect of the disclosure, a machine-readable medium comprising instructions executable by one or more processors in an apparatus, the instructions include code to access a global session state for communications with a plurality of network functions in the access network, and code to maintain a local session state for communicating with one of the network functions.

It is understood that other aspects of the invention will become readily apparent to those skilled in the art from the following detailed description, wherein it is shown and described only various aspects of the invention by way of illustration. As will be realized, the invention is capable of other and different configurations and its several details are capable of modification in various other respects, all without departing from the scope of the invention. Accordingly, the drawings and detailed description are to be regarded as illustrative in nature and not as restrictive.

DETAILED DESCRIPTION

The detailed description set forth below in connection with the appended drawings is intended as a description of various aspects of the invention and is not intended to represent the only aspects of the invention. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

The various concepts presented throughout this disclosure may be utilized across a broad array of communication systems. By way of example, a wireless communications system based on Ultra Mobile Broadband (UMB) could benefit from these concepts. UMB is an air interface standard promulgated by the 3GPP2, as part of the CDMA2000 family of standards. UMB is typically employed to provide Internet access to mobile subscribers. Another example of a wireless communications system that could benefit from these techniques is a system based on IEEE 802.20. IEEE 802.20 is a packet-based air interface designed for Internet Protocol (IP) based services. For clarity of presentation, various concepts will now be presented with reference to a distributed network architecture, however, these concepts are equally applicable to a centralized network architecture and may be readily be extended to other wireless communication systems.

Figure 1:
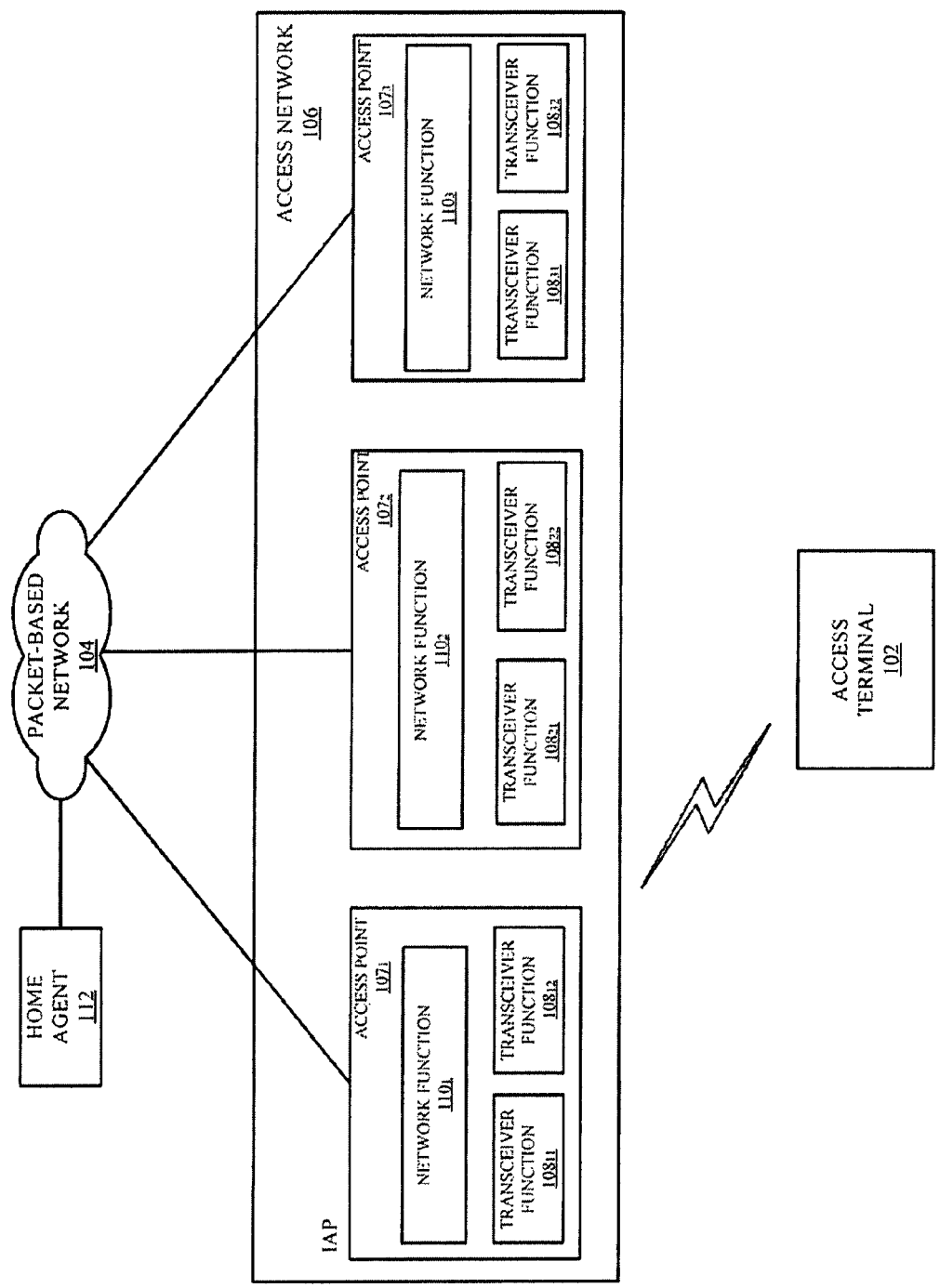
FIG. 1 is a conceptual block diagram of illustrating a distributed access network architecture including an access terminal.

FIG. 1 is a conceptual block diagram illustrating a distributed access network architecture including an access terminal. An access terminal 102 is shown connected to packet-based network 104, such as the Internet, through an access network 106. The access terminal 102 may be a fixed or mobile device in which a user can obtain service from the access network 106. By way of example, the access terminal 102 may be a cellular phone, a personal digital assistant (PDA), a personal computer, a laptop computer, a digital camera, a digital camcorder, a game console, an audio device, a video device, a multimedia device, or any other suitable device capable of receiving service from the access network 106.

The access network 106 includes multiple access points $107_1$-$107_3$ dispersed throughout a cellular coverage region with an access point located in each cell. The access point 107 includes a separate transceiver function 108 for each sector in the cell that it is serving. The transceiver function 108 is used to provide an air interface attachment point for access terminals in its sector. In this example, the air interface attachment point for the access terminal 102 shown in FIG. 1 is the transceiver function $108_{12}$. This transceiver function $108_{12}$ is referred to as the serving transceiver function.

Each access point 107 also includes a network function 110. The network function 110 is responsible for controlling the transceiver functions 108 in the access point 107 and performs tasks like allocating, managing and tearing down resources for an access terminal. In this example, the network function $110_1$ is the serving network function because it controls the transceiver function $108_{12}$ that serves as the air interface attachment point for the access terminal 102. The serving network function $110_1$ may provide the IAP for the access terminal 102. Alternatively, the IAP may be located elsewhere and an IP tunneling protocol may be used to send packets between the IAP and the serving network function $110_1$. A home agent 112, responsible for maintaining a connection over the packet-based network 104, exchanges IP packets with the access terminal 102 through the IAP.

As the radio conditions change, the access terminal 102 may change its air interface attachment point to a new sector in the active set. The process of changing the air interface attachment point is often referred to as a "L2 handoff" because it constitutes a handoff of the access terminal 102 at the link layer. The access terminal 102 performs filtered measurements on the radio conditions for the forward and reverse links for all sectors in the active set. By way of example, in a UMB based communications system, the access terminal 102 can measure the signal-to-interference noise ratio (SINR) on the acquisition pilots, the common pilot channel (if present), and the pilots on the shared signaling channel to select the forward link sector. For the reverse link, the access terminal 102 can measure the CQI erasure rate for each sector in the active set based on the up/down power control commands to the access terminal 102 from the sector.

When the access terminal 102 changes its air interface attachment point, the IAP may be moved to the network function serving the new transceiver function. The process of changing the IAP is often referred to as a "L3 handoff" because it constitutes a handoff of the access terminal 102 at the network layer. A L3 handoff requires a home agent binding update with the new IAP and requires a transfer of the global session state to the new IAP. As an alternative to a L3 handoff, an IP tunneling protocol may be used to send packets between the IAP and the serving network function.

As explained in the background portion of this disclosure, the use of the active set allows an access terminal to quickly switch between sectors and maintain service without having to make a new access attempt by (1) reserving air interface resources for the access terminal in each of the sectors in the active set, and (2) providing a copy of the global session state to each network function serving a sector in the active set.

An example will now be presented with reference to FIG. 1. When the access terminal 102 establishes an active connection with a serving transceiver function $108_{12}$, it will begin to create an active set. In this example, the signal strength from the other transceiver function $108_{11}$ in the serving access point $107_1$, as well as the transceiver functions $108_{21}$, $108_{22}$ in the neighboring access point $107_2$, should be sufficient to add the sectors served by these transceiver functions to the active set. The access terminal 102 adds the sectors to the active set by sending a connection request to the network functions $110_1$ and $110_2$. In response to the connection request, the network functions $110_1$, $110_2$ reserve air interface resources for the access terminal in these sectors. The network function $110_2$ in the neighboring access point $107_2$ also retrieves a copy of the global session state from the session master for the access terminal 102. In this example, the IAP is the session master and the serving network function $110_1$.

Figure 2:
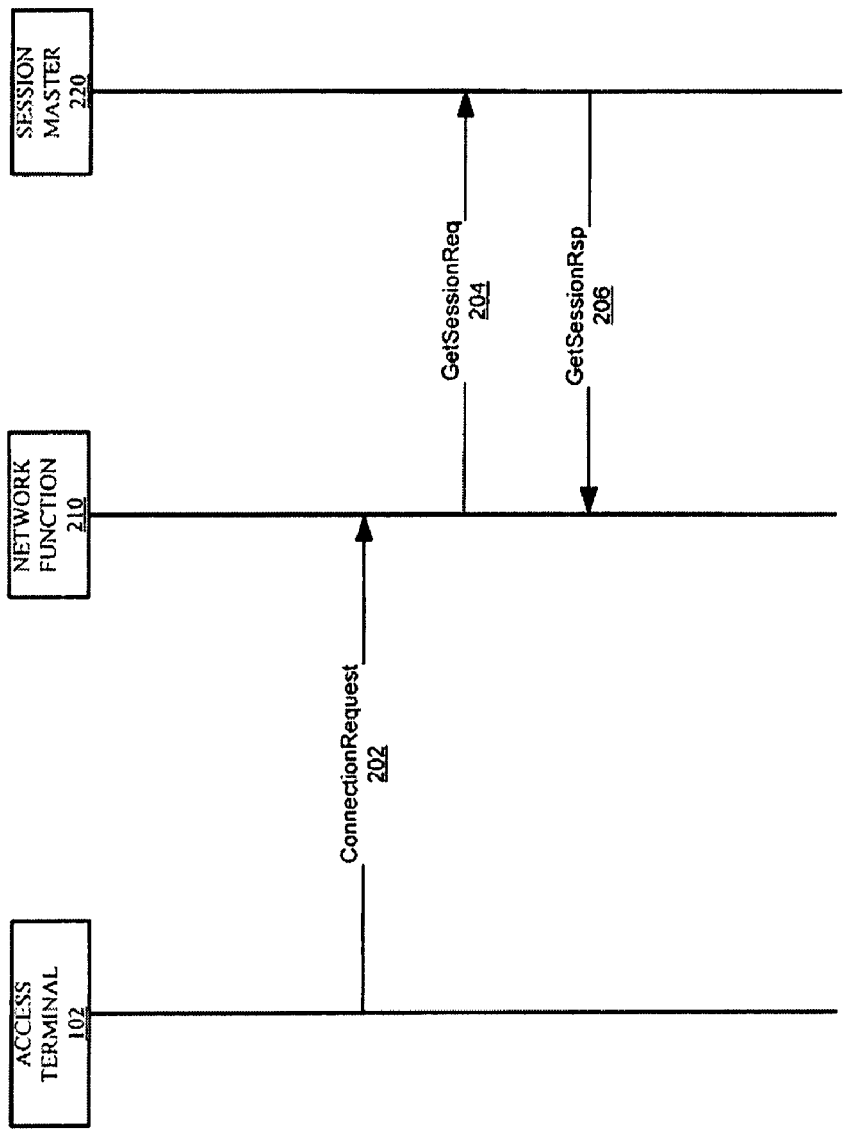
FIG. 2 is a diagram illustrating an example of a call flow for adding a sector to the active set.

FIG. 2 is a diagram illustrating an example of a call flow for adding a sector to the active set. In step 202, the access terminal 102 sends a connection request to a network function 210 controlling the sector being added to the active set. The connection request includes an identifier for the session master 220 for the access terminal 102. The identifier may be a unicast access terminal identifier (UATI), which may be used as an IP address to directly address the session master 220, or may be used to look up the address of the session master 220. In step 204, the network function 210 pulls a copy of the global session state from the session master 220 when it joins the active set by sending a "get session request" message to the session master 220. The session master 220 responds with a "get session response" that includes the attributes for the global session state.

When the access terminal 102 establishes a connection with the network function 210 (i.e., the network function becomes the serving network function), a local session state is defined for communications over the connection. The access terminal 102 and the serving network function 210 may negotiate changes to the local session state without affecting the global session state. When the connection is closed, because the access terminal is idle, or the access terminal does an L2 or L3 handoff to another access point, the local session state may be deleted. Alternatively, the local session state may persist as the connection is opened and closed multiple times. In one configuration of the access network, the local session state may expire after the connection is closed if the connection is not reestablished within a fixed period of time. In another configuration of the access network, the local session state is deleted after a fixed period of time whether or not the connection between the access terminal and the network function is opened or closed. The local session state may also be deleted in a response to a change to the global session state. The actual manner in which the local session state is maintained for an access network may vary depending in the particular application and the overall design constraints imposed on the system. Those skilled in the art will readily be able to determine the best way to implement the local session state for any particular application.

Figure 3:
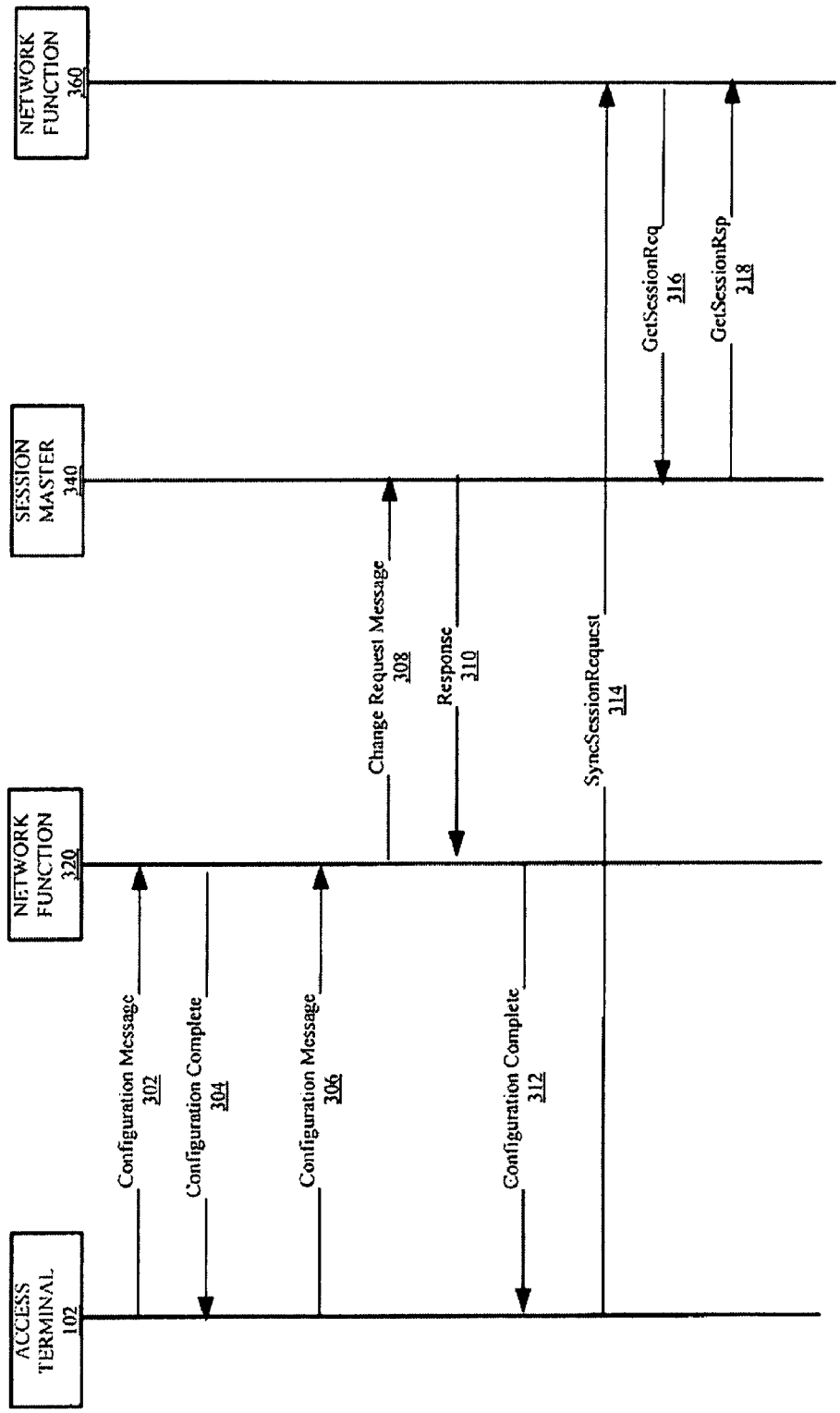
FIG. 3 is a diagram illustrating an example of a call flow for changing the session state.

FIG. 3 is a diagram illustrating an example of a call flow for changing the session state. The change may be to local session state, the global session state, or both. The access terminal or the serving network function may determine whether the change is to the local and/or session state depending on the type of change required. In this example, the serving network function 320 has an IP tunnel to a session master 340 for the access terminal 102. A second network function 360 serves a sector that is in the active set of the access terminal 102.

Referring to FIG. 3, the access terminal 102 reconfigures or changes the session state by sending a configuration message to the serving network function 320 in step 302. The configuration message may include a field which indicates whether the change should be made to the local and/or global session state. Alternatively, the access terminal 102 may use different types of configuration messages depending on whether the change is to the local or global session state. In any event, the serving network function 320 determines from the configuration message the nature of the change and where the change is to occur. In this example, the configuration message is sent in step 302 to effect a change in the local session state. In response to the configuration message, the serving network function 320 changes the local session state maintained with the access terminal 102 and then sends a configuration complete message back to the access terminal in step 304.

Alternatively, the serving network function 320 or a network function receiving the configuration message may decide whether the requested change by the access terminal 102 is to the local and/or global session state. In this case, the configuration message sent from the access terminal 102 to the serving network function in step 302 will not indicate where the change will occur. Instead, the serving network function 320 will decide and provide an indication to the access terminal 102 using a field in the configuration complete message or a specific channel to send the configuration complete message. In this example, the access terminal 102 changes its local session state in response to the configuration complete message sent in step 304.

In step 306, the access terminal 102 sends another configuration message to the serving network function 320. This time, however, the change is to the global session state either because the configuration message sent in step 306 calls for a change to the global session state or because the serving network function 320 determines the change should be to the global state session. The serving network function 320 then sends a change request message to the session master 340 in step 308. The session master 340 changes the global session state and then sends a response back to the serving network function 320, in step 310, indicating that the global session state has been changed. In step 312, the serving network function 320 sends a configuration complete message to the access terminal 102. If the serving network function 320 determined that the change should be to the global session state, then the configuration complete message will provide an indication so that the access terminal 102 can change the global session state it maintains.

Next, in step 314, the access terminal 102 sends a "synch session request" message to each network function serving a sector in the active set, requiring it to update its copy of the session state. In this example, the "synch session request" message is sent to the second network function 360. In step 316, the second network function 360 uses the UATI acquired when it was added to the active set to query the session master 340 with a "get session request" message. The session master 340 responds in step 318 with a "get session response" message that includes the attributes of the global session state.

Figure 4:
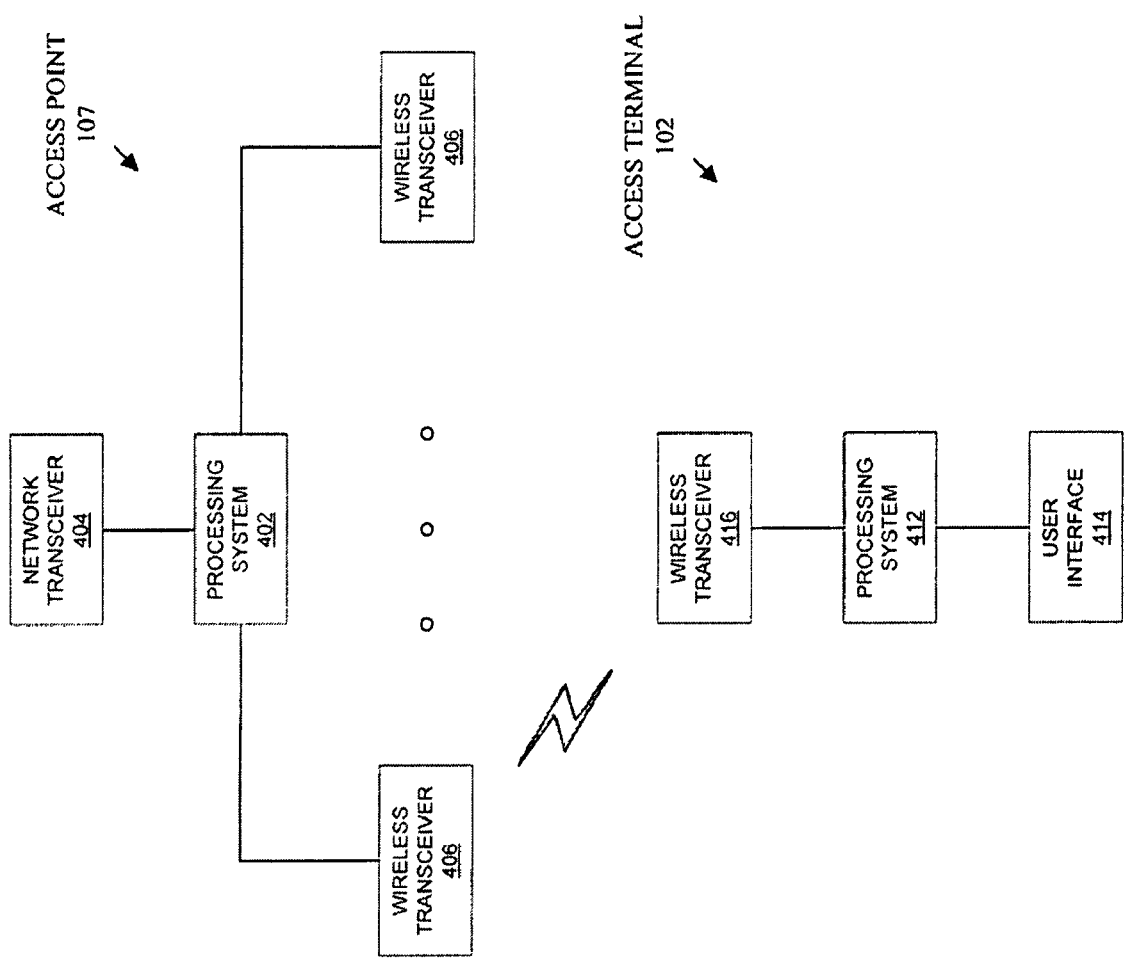
FIG. 4 is a conceptual block diagram illustrating an example of the hardware configuration for an access point and access terminal.

FIG. 4 is a conceptual block diagram illustrating an example of the hardware configuration for an access point and access terminal. In this example, the access point 107 is shown with a processing system 402, a network transceiver 404, and a wireless transceiver 406 for each sector of a cell. Each wireless transceiver 406 is used to implement the analog portion of the physical layer for the transceiver function by demodulating wireless signals and performing other RF front end processing. The processing system 402 is used to implement the digital processing portion of the physical layer, as well as implement the link layer, for the transceiver function. The processing system 402 also provides the network function in the access point 107. The network transceiver 404 provides an interface between the network function in the processing system 402 and the backhaul for the access network.

The access terminal 102 is shown with a processing system 412, a user interface 414, and a wireless transceiver 416. Much like the wireless transceivers 406 in the access point 107, the wireless transceiver 416 is used to implement the analog portion of the physical layer for the access terminal 102 by demodulating wireless signals and performing other RF front end processing. The processing system 412 is used to implement the digital processing portion of the physical layer, the link layer, the network layer, and all upper layer functions. A user interface 414 is provided to allow the user to operate the access terminal 102, and may include, by way of example, a display and keypad.

The processing system 402, 412 in the access point 107 and the access terminal 102 may be implemented with one or more processors. A processor may be a general purpose processor, such as a microprocessor, a specific application processor, such a digital signal processor (DSP), or any other hardware platform capable of supporting software. Software shall be construed broadly to mean any combination of instructions, data structures, or program code, whether referred to as software, firmware, middleware, microcode, or any other terminology. Alternatively, a processor may be an application specific integrated circuits (ASIC), a programmable logic device (PLD), a field programmable gate array (FPGA), a controller, a micro-controller, a state machine, or a combination of discrete hardware components, or any combination thereof. The processing system 402, 412 may also include a machine readable medium for storing software executed by the one or more processors. The machine readable medium may include one or more storage devices that are implemented, either in whole or part, within the processing system 402, 412. The machine readable medium may also include one or more storage devices remote to the processing system 402, 412 or be embodied by a transmission line or a carrier wave that encodes a data signal. Those skilled in the art will recognize how best to implement the described functionality for the processing system 402, 412.

Figure 5:
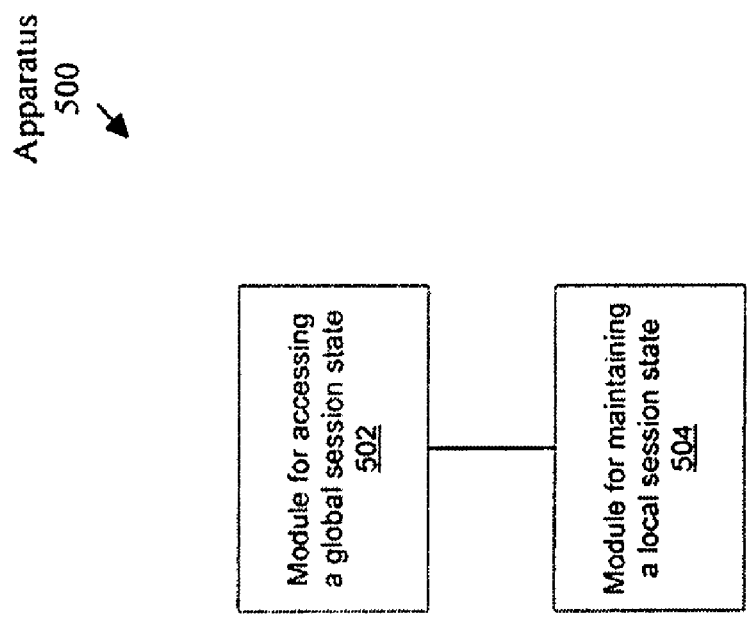
FIG. 5 is a block diagram illustrating an example of the functionality of a processing system in an apparatus for accessing an access network.

FIG. 5 is a block diagram illustrating an example of the functionality of a processing system in an apparatus for accessing an access network. The apparatus 500 may be an access terminal or other entity. The apparatus 500 includes a module 502 for accessing a global session state for communications with a plurality of network functions in the access network, and a module 504 for maintaining a local session state for communicating with one of the network functions.

Figure 6:
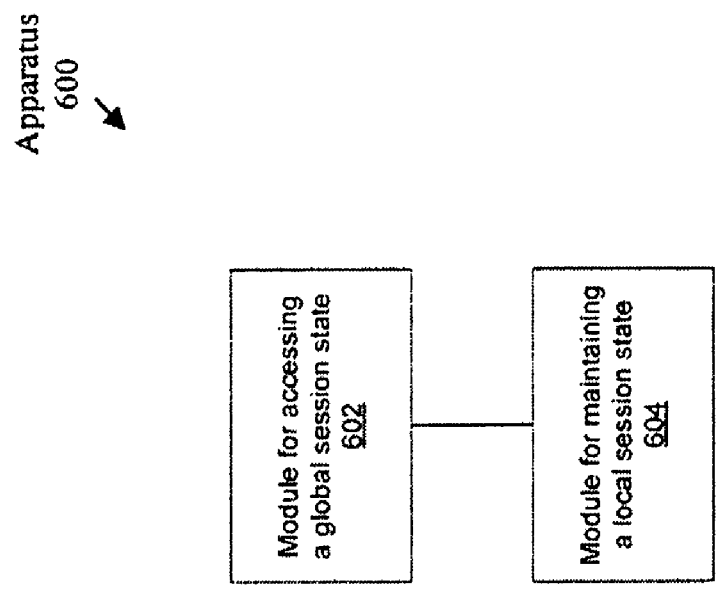
FIG. 6 is a block diagram illustrating an example of the functionality of a processing system in an apparatus for operation in an access network.

FIG. 6 is a block diagram illustrating an example of the functionality of a processing system in an apparatus for operation in an access network. The apparatus 600 may be a network function or other entity. The apparatus 600 includes a module 602 for accessing a global session state for communications between an access terminal and a plurality of network functions in the access network, and a module 604 for maintaining a local session state for communicating with the access terminal.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for operation in an access network to maintain a communication session between an access terminal and the access network, comprising:

a processing system configured to acquire a global session state from a session master for communications between the access terminal and a plurality of network functions in the access network, the processing system being further configured to maintain a local session state for communications between one of the plurality of network functions and the access terminal;

wherein the global session state comprises a plurality of first connection attributes for communicating with the access terminal, each of the plurality of first connection attributes having a respective first value;

wherein the local session state comprises a plurality of second connection attributes for communicating with the access terminal, each of the plurality of second connection attributes having a respective second value;

wherein one of the plurality of second connection attributes or a corresponding second value is different from a respective one of the plurality of first connection attributes or a corresponding first value; and wherein the plurality of second connection attributes of the local session state comprise negotiated changes to at least one of the plurality of first connection attributes of the global session state based on a negotiation between the one of the plurality of network functions and the access terminal, wherein the negotiated changes do not affect the global session state at the session master.

2. The apparatus of claim 1, wherein the processing system is further configured to change the values of one or more attributes for both the global and local session state.

3. The apparatus of claim 1, wherein the processing system is further configured to support a connection between the one of the plurality of network functions and the access terminal and to utilize the local session state over the global session state for the connection.

4. The apparatus of claim 3, wherein the processing system is further configured to define the local session state upon an establishment of the connection.

5. The apparatus of claim 1 wherein the processing system is further configured to support a connection with the access terminal, and wherein the local session state maintained by the processing system is configured to persist across a plurality of connections.

6. The apparatus of claim 1 wherein the processing system is further configured to support a connection with the access terminal and delete the local session state when the connection is closed.

7. The apparatus of claim 1 wherein the processing system is further configured to support a connection with the access terminal and delete the local session state when the access terminal performs an air interface attachment point handoff.

8. The apparatus of claim 1 wherein the processing system is further configured to support a connection with the access terminal and delete the local session state when the access terminal performs a network layer handoff.

9. The apparatus of claim 1 wherein the processing system is further configured to delete the local session state after a fixed period of time.

10. The apparatus of claim 1 wherein the processing system is further configured to support a connection with the access terminal and delete the local session state when there is no connection to the access terminal for a fixed period of time.

11. The apparatus of claim 1 wherein the processing system is further configured to delete the local session state in response to a change to the global session state.

12. The apparatus of claim 1, wherein the negotiated changes to at least one of the plurality of first connection attributes affect characteristics of the communications between the one of the plurality of network functions and the access terminal.

13. The apparatus of claim 1, wherein the plurality of first connection attributes are acquired by the one of the plurality of network functions from the session master.

14. An apparatus for accessing an access network and maintaining one or more communication sessions with the access network, comprising:

a processing system configured to acquire a global session state from a session master for communications with a plurality of network functions in the access network, the processing system being further configured to maintain a local session state for communications with one of the plurality of network functions;

wherein the global session state comprises a plurality of first connection attributes for communicating with an access terminal, each of the plurality of first connection attributes having a respective first value;

wherein the local session state comprises a plurality of second connection attributes for communicating with the access terminal, each of the plurality of second connection attributes having a respective second value;

wherein one of the plurality of second connection attributes or a corresponding second value is different from a respective one of the plurality of first connection attributes or a corresponding first value; and wherein the plurality of second connection attributes of the local session state comprise negotiated changes to at least one of the plurality of first connection attributes of the global session state based on a negotiation between the access terminal and the one of the plurality of network functions, wherein the negotiated changes do not affect the global session state at the session master.

15. The apparatus of claim 14, wherein the processing system is further configured to change the values of one or more attributes for both the global and local session state.

16. The apparatus of claim 14, wherein the processing system is further configured to support a connection with said one of the network functions and to utilize the local session state over the global session state for the connection.

17. The apparatus of claim 16, wherein the processing system is further configured to define the local session state upon an establishment of the connection.

18. The apparatus of claim 14 wherein the processing system is further configured to support a connection with said one of the network functions, and wherein the local session state maintained by the processing system is configured to persist across a plurality of connections.

19. The apparatus of claim 14 wherein the processing system is further configured to support a connection with said one of the network functions and delete the local session state when the connection is closed.

20. The apparatus of claim 14 wherein the processing system is further configured to support a connection with said one of the network functions and delete the local session state when the processing system performs an air interface attachment point handoff.

21. The apparatus of claim 14 wherein the processing system is further configured to support a connection with said one of the network functions and delete the local session state when the processing system performs a network layer handoff.

22. The apparatus of claim 14 wherein the processing system is further configured to delete the local session state after a fixed period of time.

23. The apparatus of claim 14 wherein the processing system is further configured to support a connection with said one of the network functions and delete the local session state when there is no connection to said one of the network functions for a fixed period of time.

24. The apparatus of claim 14 wherein the processing system is further configured to delete the local session state in response to a change to the global session state.

25. The apparatus of claim 14, wherein the negotiated changes to at least one of the plurality of first connection attributes affect characteristics of the communications between the one of the plurality of network functions and the access terminal.

26. The apparatus of claim 14, wherein the plurality of first connection attributes are acquired by the one of the plurality of network functions from the session master.

27. An apparatus for operation in an access network to maintain a communication session between an access terminal and the access network, comprising:
  means for acquiring a global session state from a session master for communications between the access terminal and a plurality of network functions in the access network;
  means for maintaining a local session state for communications between one of the plurality of network functions and the access terminal;
  wherein the global session state comprises a plurality of first connection attributes for communicating with the access terminal, each of the plurality of first connection attributes having a respective first value;
  wherein the local session state comprises a plurality of second connection attributes for communicating with the access terminal, each of the plurality of second connection attributes having a respective second value;
  wherein one of the plurality of second connection attributes or a corresponding second value is different from a respective one of the plurality of first connection attributes or a corresponding first value; and
  wherein the plurality of second connection attributes of the local session state comprise negotiated changes to at least one of the plurality of first connection attributes of the global session state based on a negotiation between the one of the plurality of network functions and the access terminal, wherein the negotiated changes do not affect the global session state at the session master.

28. An apparatus for accessing an access network and maintaining one or more communication sessions with the access network, comprising:
  means for acquiring a global session state from a session master for communications with a plurality of network functions in the access network; and
  means for maintaining a local session state for communications with one of the plurality of network functions;
  wherein the global session state comprises a plurality of first connection attributes for communicating with an access terminal, each of the plurality of first connection attributes having a respective first value;
  wherein the local session state comprises a plurality of second connection attributes for communicating with the access terminal, each of the plurality of second connection attributes having a respective second value;
  wherein one of the plurality of second connection attributes or a corresponding second value is different from a respective one of the plurality of first connection attributes or a corresponding first value; and
  wherein the plurality of second connection attributes of the local session state comprise negotiated changes to at least one of the plurality of first connection attributes of the global session state based on a negotiation between the access terminal and the one of the plurality of network functions, wherein the negotiated changes do not affect the global session state at the session master.

29. A method of operating in an access network to maintain a communication session between an access terminal and the access network, comprising:
  acquiring a global session state from a session master for communications between the access terminal and a plurality of network functions in the access network;
  maintaining a local session state for communications between one of the plurality of network functions and the access terminal;
  wherein the global session state comprises a plurality of first connection attributes for communicating with the access terminal, each of the plurality of first connection attributes having a respective first value;
  wherein the local session state comprises a plurality of second connection attributes for communicating with the access terminal, each of the plurality of second connection attributes having a respective second value;
  wherein one of the plurality of second connection attributes or a corresponding second value is different from a respective one of the plurality of first connection attributes or a corresponding first value; and
  wherein the plurality of second connection attributes of the local session state comprise negotiated changes to at least one of the plurality of first connection attributes of the global session state based on a negotiation between the one of the plurality of network functions and the access terminal, wherein the negotiated changes do not affect the global session state at the session master.

30. The method of claim 29 further comprising supporting a connection with the access terminal, and wherein the local session state is maintained across a plurality of connections.

31. The method of claim 29 further comprising supporting a connection with the access terminal and deleting the local session state when the connection is closed.

32. The method of claim 29 further comprising supporting a connection with the access terminal and deleting the local session state when the access terminal performs an air interface attachment point handoff.

33. The method of claim 29 further comprising supporting a connection with the access terminal and deleting the local session state when the access terminal performs a network layer handoff.

34. The method of claim 29 further comprising deleting the local session state after a fixed period of time.

35. The method of claim 29 further comprising supporting a connection with the access terminal and deleting the local session state when there is no connection to the access terminal for a fixed period of time.

36. The method of claim 29 further comprising deleting the local session state in response to a change to the global session state.

37. The method of claim 29, further comprising supporting a connection with the access terminal and utilizing the local session state over the global session state for the connection.

38. The method of claim 37, further comprising defining the local session state upon an establishment of the connection.

39. The method of claim 29, wherein the negotiated changes to at least one of the plurality of first connection attributes affect characteristics of the communications between the one of the plurality of network functions and the access terminal.

40. The method of claim 29, wherein the plurality of first connection attributes are acquired by the one of the plurality of network functions from the session master.

41. A method of accessing an access network and maintaining one or more communication sessions with the access network, comprising:
   acquiring a global session state from a session master for communications with a plurality of network functions in the access network; and
   maintaining a local session state for communications with one of the plurality of network functions;
   wherein the global session state comprises a plurality of first connection attributes for communicating with an access terminal, each of the plurality of first connection attributes having a respective first value;
   wherein the local session state comprises a plurality of second connection attributes for communicating with the access terminal, each of the plurality of second connection attributes having a respective second value;
   wherein one of the plurality of second connection attributes or a corresponding second value is different from a respective one of the plurality of first connection attributes or a corresponding first value; and
   wherein the plurality of second connection attributes of the local session state comprise negotiated changes to at least one of the plurality of first connection attributes of the global session state based on a negotiation between the access terminal and the one of the plurality of network functions, wherein the negotiated changes do not affect the global session state at the session master.

42. The method of claim 41 further comprising supporting a connection with said one of the network functions, and wherein the local session state is maintained across a plurality of connections.

43. The method of claim 41 further comprising supporting a connection with said one of the network functions and deleting the local session state when the connection is closed.

44. The method of claim 41 further comprising supporting a connection with said one of the network functions and deleting the local session state when the processing system performs an air interface attachment point handoff.

45. The method of claim 41 further comprising supporting a connection with said one of the network functions and deleting the local session state when the processing system performs a network layer handoff.

46. The method of claim 41 further comprising deleting the local session state after a fixed period of time.

47. The method of claim 41 further comprising supporting a connection with said one of the network functions and deleting the local session state when there is no connection to said one of the network functions for a fixed period of time.

48. The method of claim 41 further comprising deleting the local session state in response to a change to the global session state.

49. The method of claim 41, further comprising supporting a connection with said one of the network functions and utilizing the local session state over the global session state for the connection.

50. The method of claim 49, further comprising defining the local session state upon an establishment of the connection.

51. The method of claim 41, wherein the negotiated changes to at least one of the plurality of first connection attributes affect characteristics of the communications between the one of the plurality of network functions and the access terminal.

52. The method of claim 41, wherein the plurality of first connection attributes are acquired by the one of the plurality of network functions from the session master.

53. A non-transitory machine-readable medium comprising instructions executable by one or more processors in an apparatus for operating in an access network to maintain a communication session between an access terminal and the access network, the instructions comprising:
   code to acquire a global session state from a session master for communications between the access terminal and a plurality of network functions in the access network;
   code to maintain a local session state for communications between one of the plurality of network functions and the access terminal;
   wherein the global session state comprises a plurality of first connection attributes for communicating with the access terminal, each of the plurality of first connection attributes having a respective first value;
   wherein the local session state comprises a plurality of second connection attributes for communicating with the access terminal, each of the plurality of second connection attributes having a respective second value;
   wherein one of the plurality of second connection attributes or a corresponding second value is different from a respective one of the plurality of first connection attributes or a corresponding first value; and
   wherein the plurality of second connection attributes of the local session state comprise negotiated changes to at least one of the plurality of first connection attributes of the global session state based on a negotiation between the one of the plurality of network functions and the access terminal, wherein the negotiated changes do not affect the global session state at the session master.

54. A non-transitory machine-readable medium comprising instructions executable by one or more processors in an apparatus for accessing an access network and maintaining one or more communication sessions with the access network, the instructions comprising:
   code to acquire a global session state from a session master for communications with a plurality of network functions in the access network; and
   code to maintain a local session state for communications with one of the plurality of network functions;
   wherein the global session state comprises a plurality of first connection attributes for communicating with an access terminal, each of the plurality of first connection attributes having a respective first value;
   wherein the local session state comprises a plurality of second connection attributes for communicating with the access terminal, each of the plurality of second connection attributes having a respective second value;
   wherein one of the plurality of second connection attributes or a corresponding second value is different from a respective one of the plurality of first connection attributes or a corresponding first value; and
   wherein the plurality of second connection attributes of the local session state comprise negotiated changes to at least one of the plurality of first connection attributes of the global session state based on a negotiation between the access terminal and the one of the plurality of network functions, wherein the negotiated changes do not affect the global session state at the session master.

* * * * *